United States Patent
Yang et al.

(10) Patent No.: US 10,150,447 B2
(45) Date of Patent: Dec. 11, 2018

(54) APPARATUS AND METHOD FOR STORING IMAGE ON BASIS OF INPUT SOUND SIGNAL

(71) Applicant: CENTER FOR INTEGRATED SMART SENSORS FOUNDATION, Daejeon (KR)

(72) Inventors: Jin Young Yang, Seoul (KR); Ji Hoon Park, Daejeon (KR); Jin Yeon Lim, Andong-si (KR); Chong Min Kyung, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 15 days.

(21) Appl. No.: 15/124,350

(22) PCT Filed: Mar. 4, 2015

(86) PCT No.: PCT/KR2015/002084
§ 371 (c)(1),
(2) Date: Sep. 7, 2016

(87) PCT Pub. No.: WO2015/137658
PCT Pub. Date: Sep. 17, 2015

(65) Prior Publication Data
US 2017/0018127 A1 Jan. 19, 2017

(30) Foreign Application Priority Data
Mar. 13, 2014 (KR) .................. 10-2014-0029600

(51) Int. Cl.
*B60R 25/30* (2013.01)
*B60R 25/32* (2013.01)
(Continued)

(52) U.S. Cl.
CPC ........ *B60R 25/302* (2013.01); *B60R 21/0136* (2013.01); *B60R 25/305* (2013.01);
(Continued)

(58) Field of Classification Search
CPC ..... B60R 25/302; B60R 25/305; B60R 25/32; B60R 21/0136; G07C 5/0866; G07C 5/0891
See application file for complete search history.

(56) References Cited

U.S. PATENT DOCUMENTS 6,186,539 B1 * 2/2001 Foo et al. ........... B60R 21/0136
701/45
6,324,450 B1 * 11/2001 Iwama ................. G07C 5/0891
340/440

(Continued)

FOREIGN PATENT DOCUMENTS

JP   2000-079839 A   3/2000
JP   2004-099002 A   4/2004
(Continued)

OTHER PUBLICATIONS

Google Patents Translation of KR20120103286A, Choi, 12 pages.*
International Search Report for PCT/KR2015/002084 dated May 20, 2015 from Korean Intellectual Property Office.

*Primary Examiner* — Dale W Hilgendorf
(74) *Attorney, Agent, or Firm* — Revolution IP, PLLC

(57) ABSTRACT

An image storage device based on an input sound signal comprises: an acceleration sensor unit for outputting an acceleration sensor value according to an impact event; a microphone unit for receiving an input of an impact sound according to the impact event; a camera unit for photographing an external image; and a processing unit for, if an impact event is sensed by the acceleration sensor unit and the impact sound inputted by the microphone unit corresponds to a valid sound which is previously set and stored, storing,
(Continued)

in a storage unit, the images photographed by the camera unit in a certain time period both before and after the point in time when the impact event occurred.

15 Claims, 12 Drawing Sheets

(51) Int. Cl.
*B60R 21/0136* (2006.01)
*G07C 5/08* (2006.01)

(52) U.S. Cl.
CPC ............ *B60R 25/32* (2013.01); *G07C 5/0866* (2013.01); *G07C 5/0891* (2013.01)

(56) References Cited

U.S. PATENT DOCUMENTS

2006/0192658 A1* 8/2006 Yamamura ............ B60R 25/302
340/425.5
2010/0138040 A1* 6/2010 Kwon ..................... G06F 19/00
700/246

FOREIGN PATENT DOCUMENTS

| | | |
|---|---|---|
| KR | 10-0833096 B1 | 5/2008 |
| KR | 10-1015408 A | 12/2010 |
| KR | 10-2011-0121885 A | 11/2011 |
| KR | 10-2012-0103286 A | 9/2012 |
| KR | 20120103286 A * | 9/2012 ............. B62D 41/00 |

* cited by examiner

Mixture: 10
Iteration: 300

APPARATUS AND METHOD FOR STORING IMAGE ON BASIS OF INPUT SOUND SIGNAL

CROSS REFERENCE TO PRIOR APPLICATIONS

This application is a National Stage Application of PCT International Patent Application No. PCT/KR2015/002084 filed on Mar. 4, 2015, under 35 U.S.C. § 371, which claims priority to Korean Patent Application No. 10-2014-0029600 filed on Mar. 13, 2014, which are all hereby incorporated by reference in their entirety.

TECHNICAL FIELD

The present invention relates to an image storage device and method based on an input sound signal and, more particularly, to an image storage device and method based on an input sound signal, wherein an image is stored when a valid impact event sound is received in addition to acceleration sensor values in a vehicle black box.

BACKGROUND ART

In general, a vehicle black box operates in driving mode and parking mode depending on the start-up state of a vehicle.

Upon driving mode, a screen is stored in accordance with three types of recording methods, such as normal permanent recording, permanent impact recording, and manual recording.

Permanent recording is a method for capturing all images in a specific time unit and storing the images in a permanent recording folder while driving. Permanent impact recording is a method for capturing an image at a previous specific time and an image at a subsequent specific time on the basis of an impact time when an impact of sensitivity or higher set by a user is generated (hereinafter referred to as an "impact event") and storing the images in a permanent impact folder. Manual recording is a method for capturing an image at a previous specific time and an image at a subsequent specific time on the basis of a point of time at which a specific button is pressed and storing the images in a manual recording folder.

In the permanent impact recording, an acceleration sensor is chiefly used as an input device so as to sense an impact event. An impact event sensing algorithm determines whether a difference between the instant size of each of acceleration values in the X, Y, and Z directions of the acceleration sensor and an average size during a recent specific time is a value of sensitivity or higher set by a user, and determines the difference to be an impact event if the value of sensitivity or higher is output.

The impact event sensing algorithm using an acceleration sensor determines whether a moment acceleration value is a set value or higher. However, an unwanted accident attributable to an impacted road or a speed bump depending on a road condition in which the vehicle is driven and an invalid impact event (i.e., false positive) when a vehicle door is open/shut or a trunk is closed while the vehicle stops are generated in addition to a valid impact event (i.e., true positive), such as the collision of a vehicle that a vehicle black box has originally attempts to sense.

A storage space of a limited size is filled with the image file of an invalid impact event because an image of a specific time is stored in the permanent impact folder when such an invalid impact event is generated. Accordingly, there were problems in that it is difficult for a user to find out an actual required valid impact event and the lifespan of SD card type flash memory is reduced because a large image file that does not need to be actually stored continues to be stored.

Furthermore, if a folder of a limited size is filled with many invalid impact events, the oldest image file is overwritten. In this case, there was a problem in that a valid impact event may be overwritten.

PRIOR ART DOCUMENT (Patent Document 1) Korean Patent No. 10-1015408

DISCLOSURE

Technical Problem

The present invention has been made to solve the above problems, and an object of the present invention is to provide an image storage device and method based on an input sound signal, wherein a larger number of images are stored in memory having a limited storage space in such a manner that a valid sound according to a valid impact event and an invalid sound according to an invalid impact event are previously set, when an impact sound according to an impact event is received in addition to acceleration sensor values in a vehicle black box, the impact sound is compared with the valid sound and the invalid sound, an image at a previous specific time and an image at a subsequent specific time on the basis of a point of time at which the impact event is generated are stored if the impact sound is matched with the valid sound, and an image is not stored if the impact sound is matched with the invalid sound.

Technical Solution

An image storage device based on an input sound signal of the present invention for achieving the above object is configured to include an acceleration sensor unit which outputs an acceleration sensor value according to an impact event; a microphone unit which receives an impact sound according to the impact event; a camera unit which captures an external image; and a processing unit which enables images captured through the camera unit for a previous specific time and a subsequent specific time based on a point of time at which the impact event is generated to be stored in a storage unit if the impact event through the acceleration sensor unit is sensed and the impact sound received through the microphone unit corresponds to a previously set and stored valid sound.

Verification sounds comprising a previously set valid sound and invalid sound may have been stored in the storage unit.

The valid sound may be a sound related to a vehicle accident, and the invalid sound may be a sound not related to a vehicle accident.

The processing unit may not store an image captured through the camera unit in the storage unit if the impact event through the acceleration sensor unit is sensed and the impact sound received through the microphone unit corresponds to the previously set and stored invalid sound.

The processing unit may determine a difference between a current acceleration sensor value and an average value of previous acceleration sensor values to be the impact event if the difference is greater than a predetermined detection setting value.

Furthermore, an image storage method based on an input sound signal of the present invention for achieving the above object includes (a) a sensor comparison step for comparing, by a processing unit, a difference between a current acceleration sensor value received through an acceleration sensor unit and an average value of previous acceleration sensor values with a predetermined detection setting value; (b) a sound comparison step for comparing an impact sound according to an impact event received through a microphone unit with previously set and stored verification sounds if the difference between the current acceleration sensor value and the average value is greater than the detection setting value in the sensor comparison step; and (c) an image storage step for storing images captured through a camera unit for a previous specific time and a subsequent specific time based on a point of time at which the impact event is generated in a storage unit if the impact sound is matched with a valid sound of the verification sounds in the sound comparison step.

The image storage method may further include a sound detection step for detecting a background noise in an input sound; a feature point extraction step for extracting a feature point from the input sound other than the background noise detected in the sound detection step; and a classification step for classifying the input sound from which the feature point has been extracted through the feature point extraction step as a valid sound and an invalid sound and storing the valid sound and the invalid sound as the verification sounds, prior to the sound comparison step.

The sound comparison step may include a sound detection step for detecting a background noise in the impact sound; a feature point extraction step for extracting a feature point from the impact sound other than the background noise detected in the sound detection step; a comparison step for comparing the feature point of the impact sound extracted in the feature point extraction step with the verification sound; and a verification step for verifying whether the impact sound is a valid sound or invalid sound of the verification sound through the comparison step.

The sound detection step may include calculating log energy of the input sound having a frame unit of a length of 30 ms and the impact sound and detecting the background noise.

In the feature point extraction step, a Mel frequency cepstrum coefficient may be used to extract the feature points of the input sound and the impact sound other than the background noise.

The classification step may include classifying the input sound from which the feature point has been extracted as the valid sound and the invalid sound using a Gaussian mixture model.

The comparison step may include calculating a maximum likelihood value of the impact sound from which the feature point has been extracted and comparing the maximum likelihood value with the verification sound.

Advantageous Effects

In accordance with the image storage device and method based on an input sound signal of the present invention, such as that described above, a valid sound according to a valid impact event and an invalid sound according to an invalid impact event are previously set. When an impact sound according to an impact event is received in addition to acceleration sensor values in a vehicle black box, the impact sound is compared with the valid sound and the invalid sound. An image at a previous specific time and an image at a subsequent specific time on the basis of a point of time at which the impact event is generated are stored if the impact sound is matched with the valid sound. An image is not stored if the impact sound is matched with the invalid sound. Accordingly, there is an advantage in that a larger number of images are stored in memory having a limited storage space.

DESCRIPTION OF REFERENCE NUMERALS

100: processing unit
200: microphone unit
300: acceleration sensor unit
400: front camera unit
500: rear camera unit

MODE FOR INVENTION

Hereinafter, preferred embodiments of the present invention are described in detail with reference to the accompanying drawings in order to describe the present invention in detail so that those skilled in the art to which the present invention pertains may easily practice the present invention.

Figure 1:
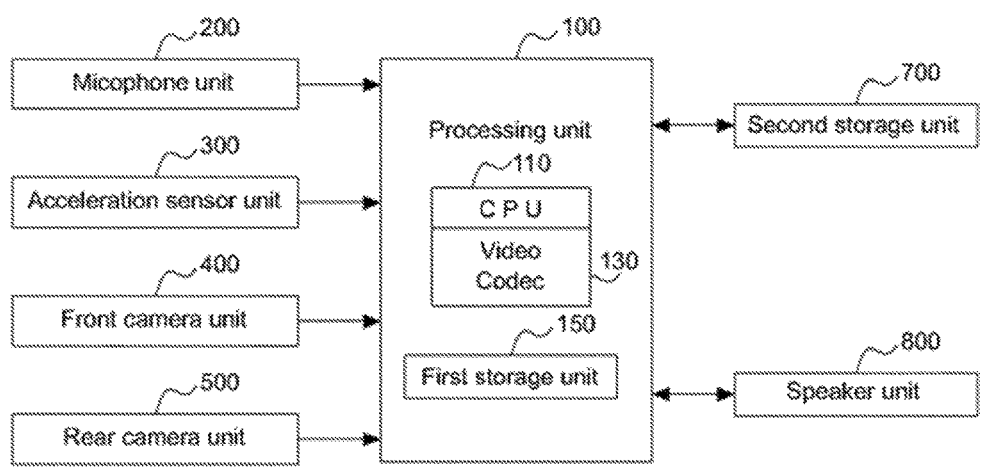
FIG. 1 is a block diagram showing an image storage device according to an embodiment of the present invention.
Figure 2:
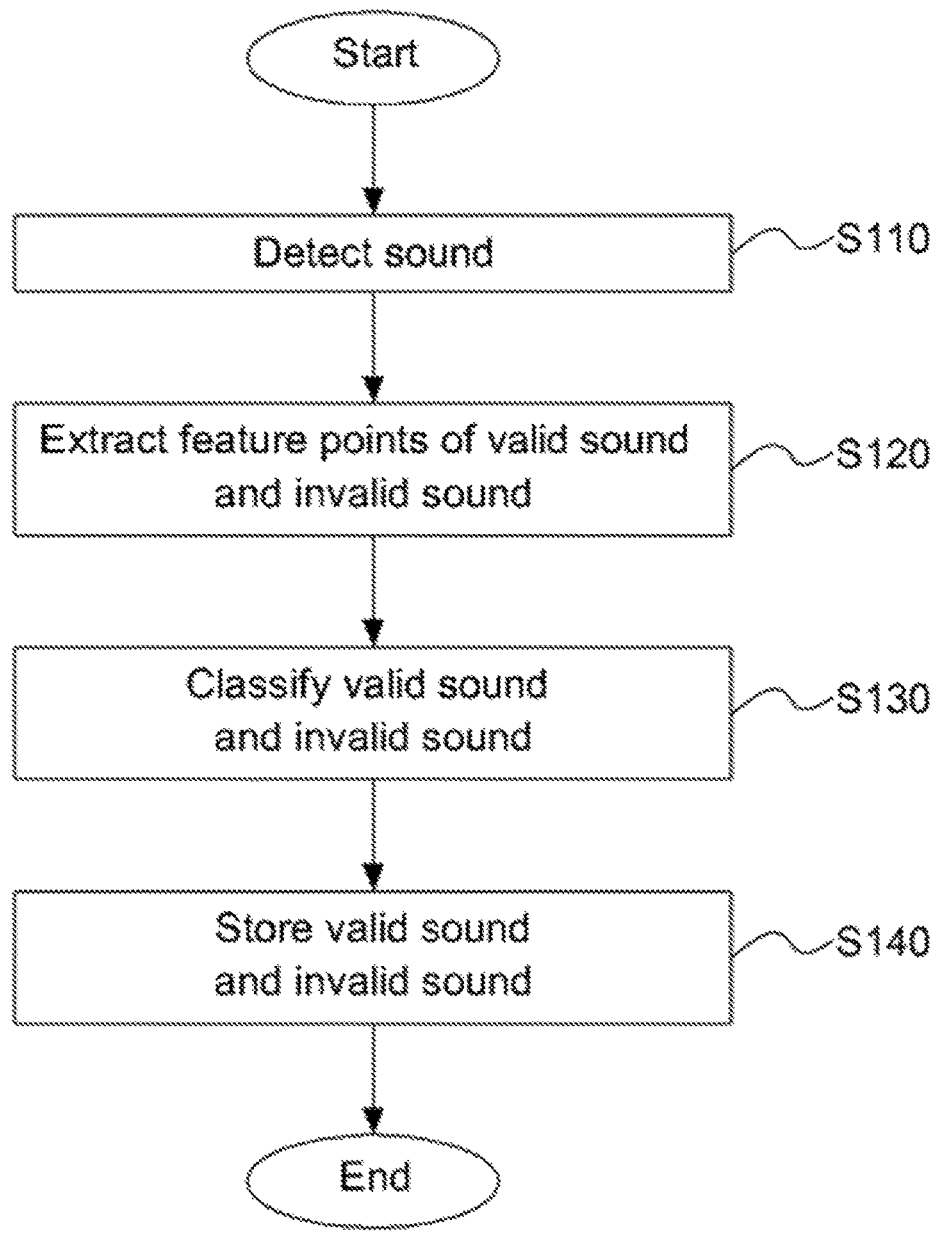
FIG. 2 is a flowchart shown to illustrate a method for setting a valid sound and an invalid sound according to an embodiment of the present invention.
Figure 3:
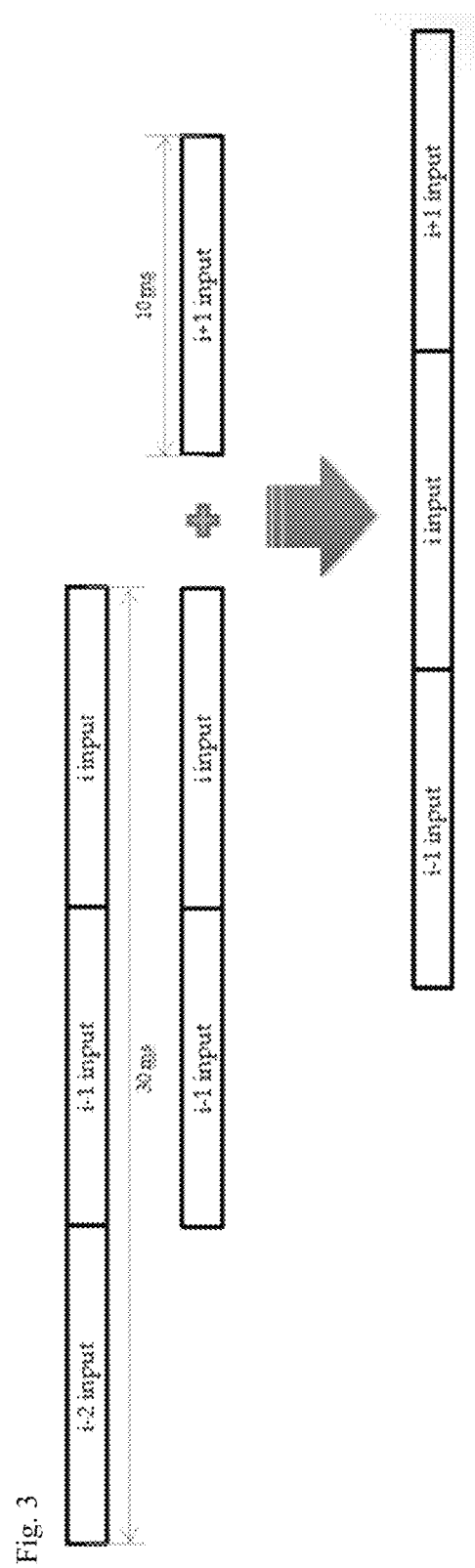
FIGS. 3 to 5 are exemplary diagrams shown to illustrate the detection of a sound in the method for setting a valid sound and an invalid sound according to an embodiment of the present invention.
Figure 4:
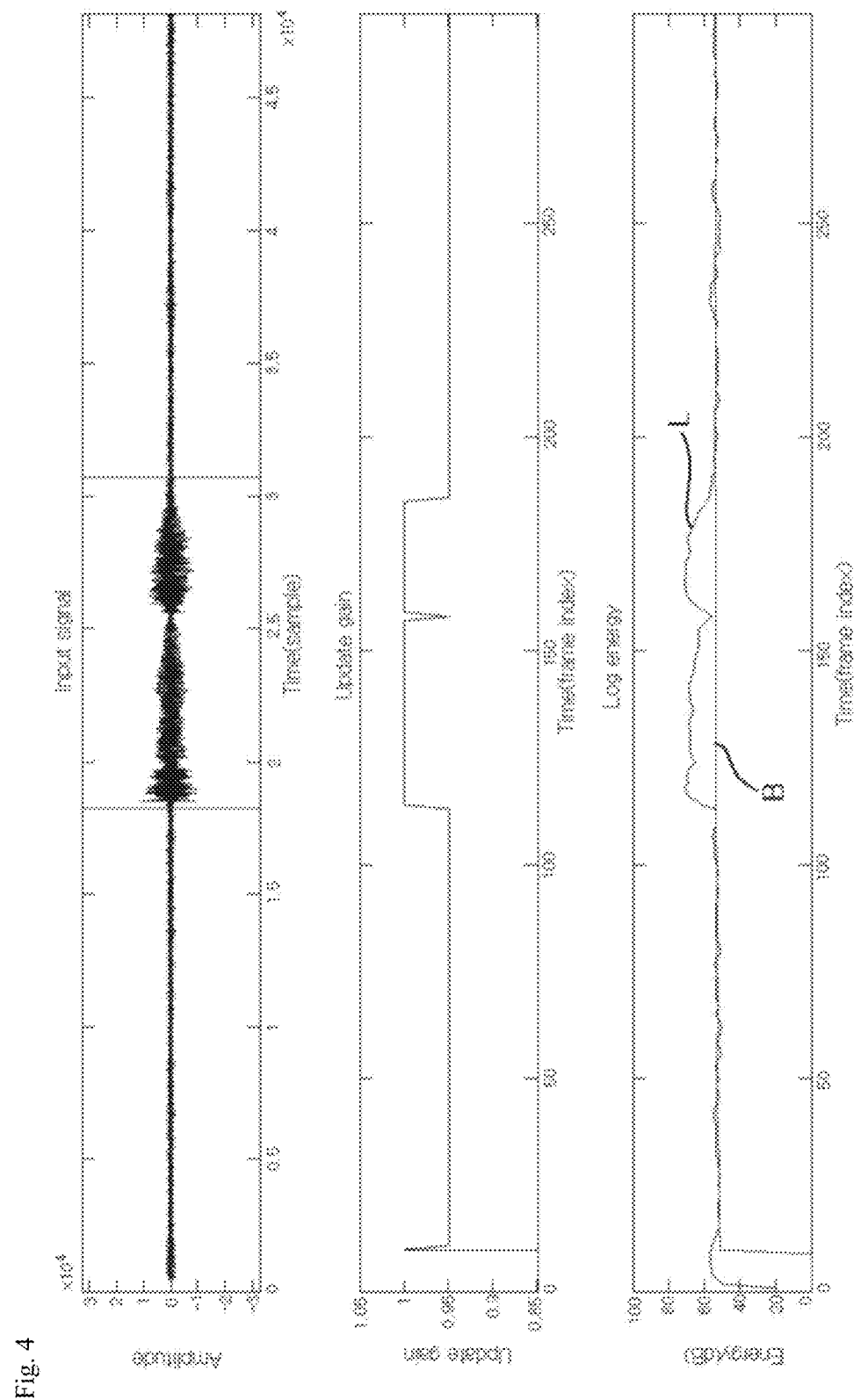
Figure 5:
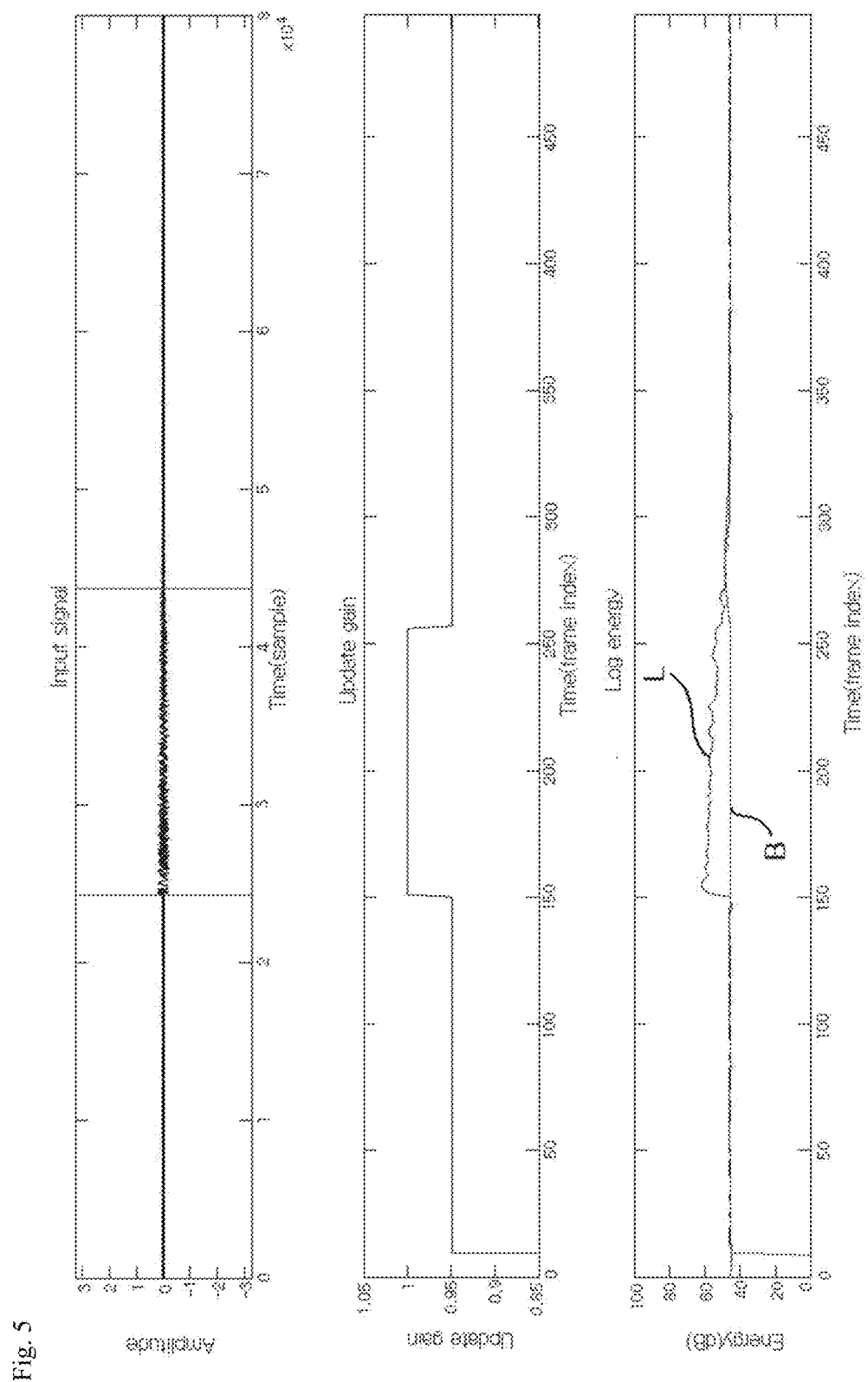
Figure 6:
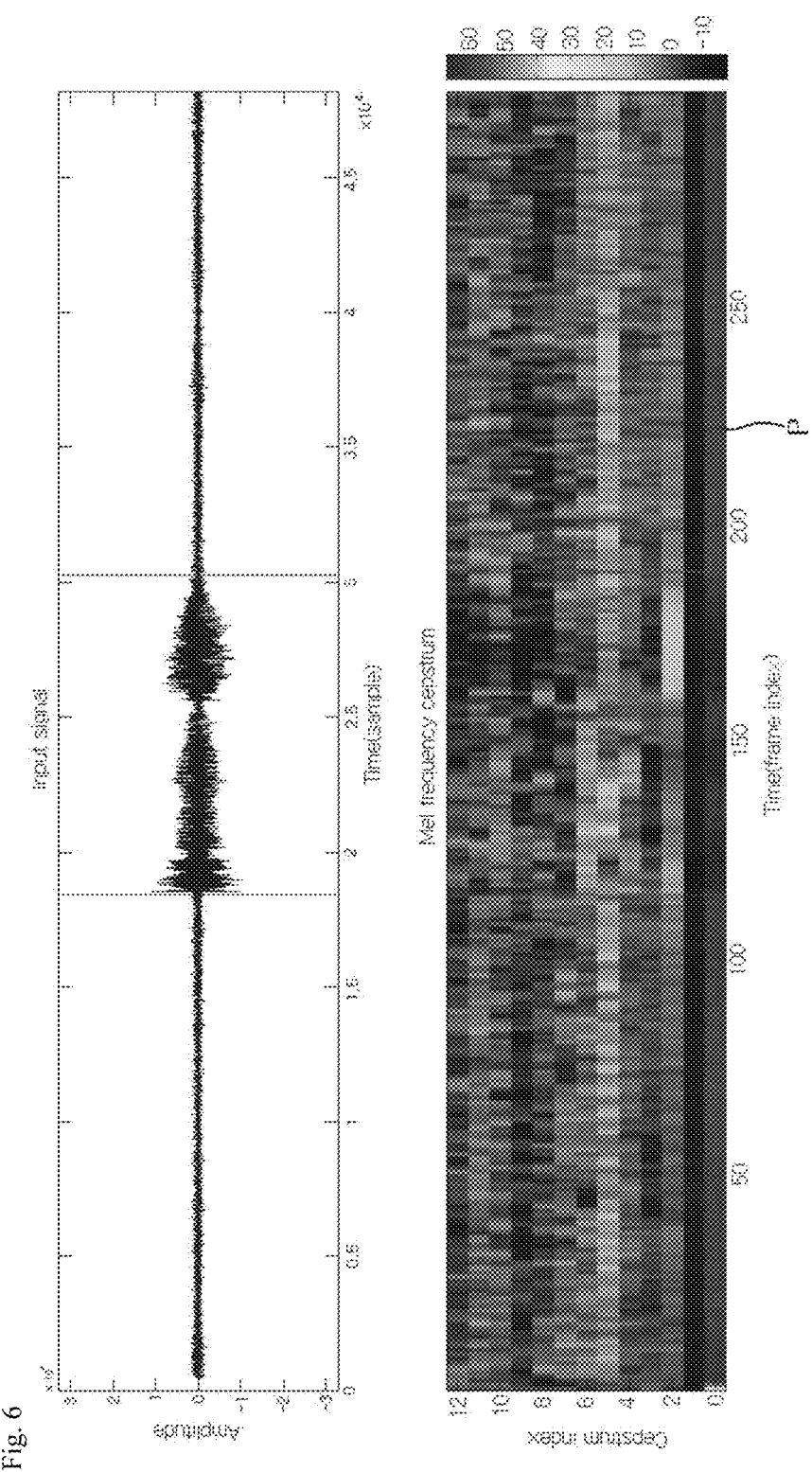
FIG. 6 is an exemplary diagram shown to illustrate the extraction of feature points in the method for setting a valid sound and an invalid sound according to an embodiment of the present invention.
Figure 7:
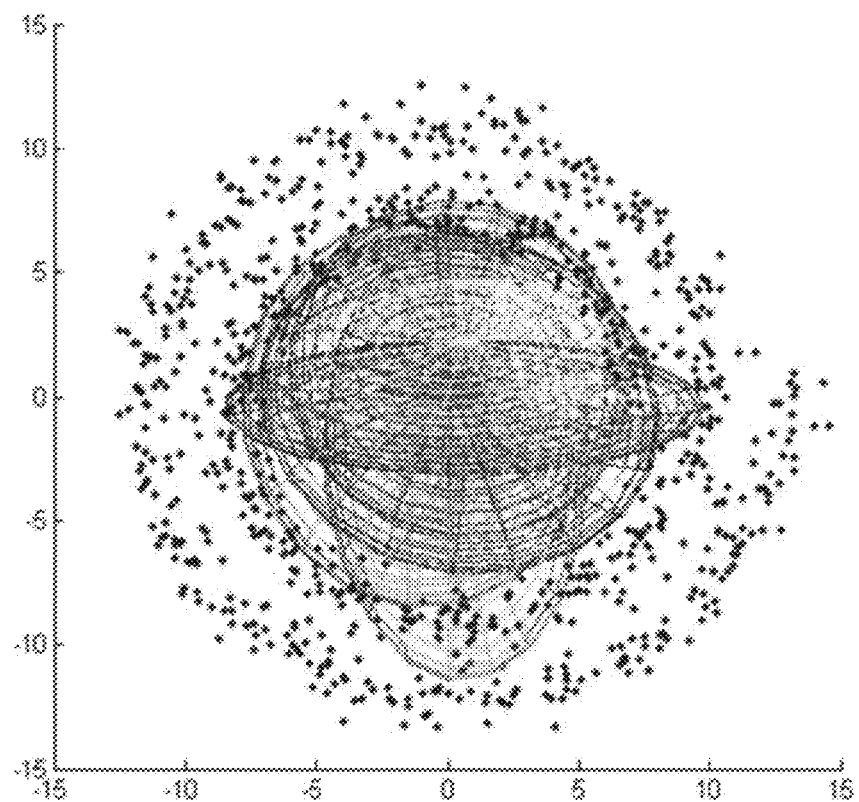
FIGS. 7 to 9 are exemplary diagrams shown to illustrate a classification process in the method for setting a valid sound and an invalid sound according to an embodiment of the present invention.
Figure 8:
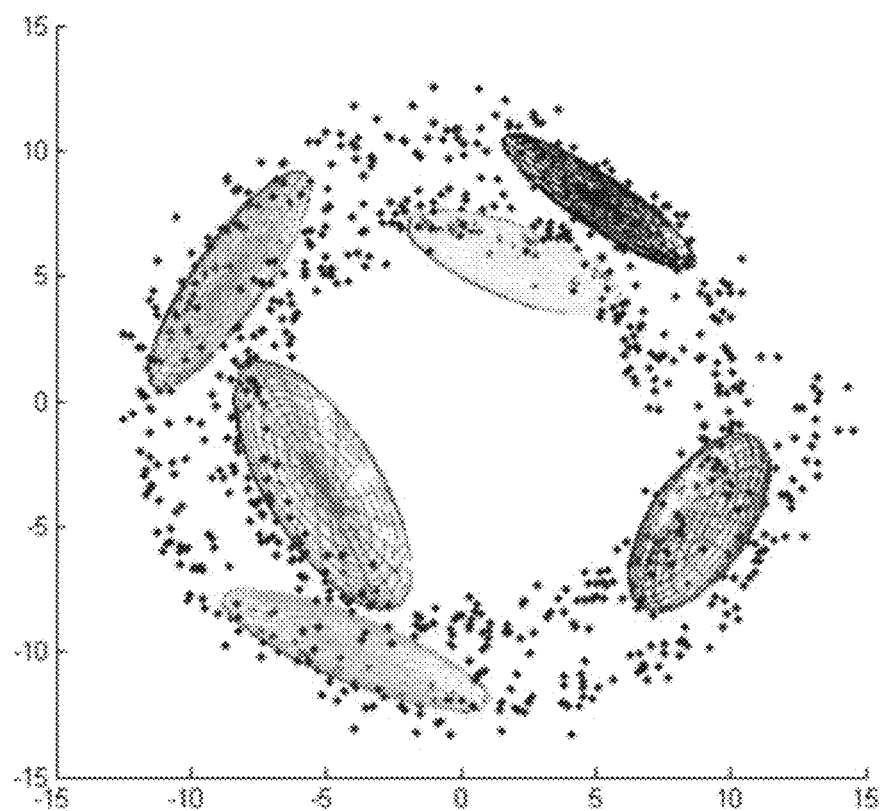
Figure 9:
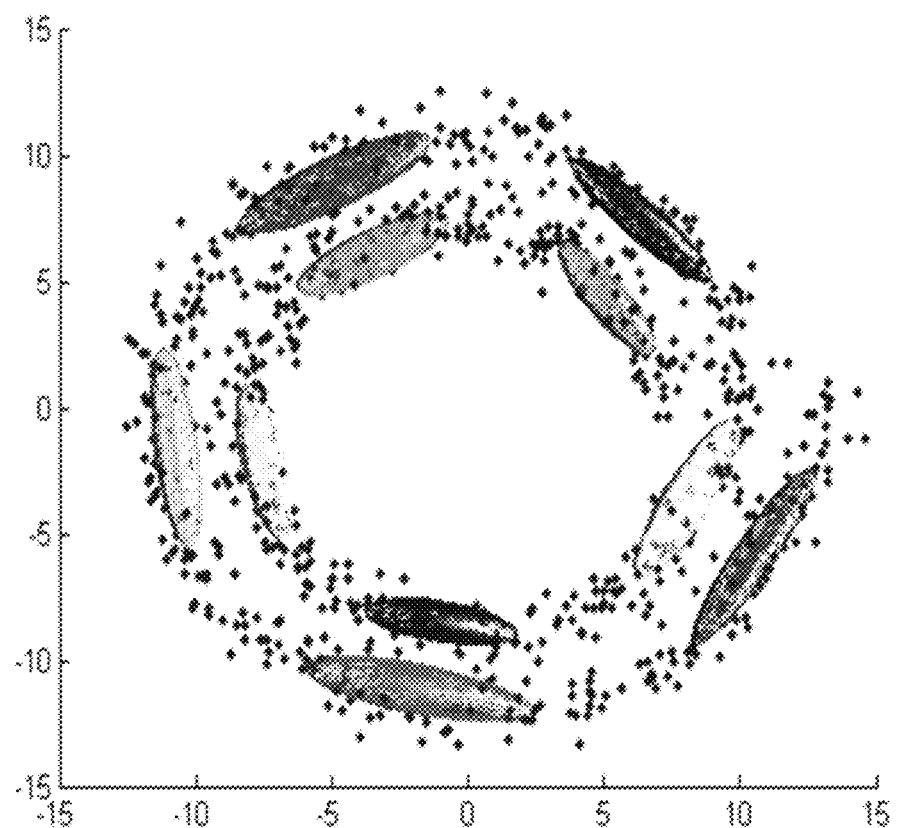
Figure 10:
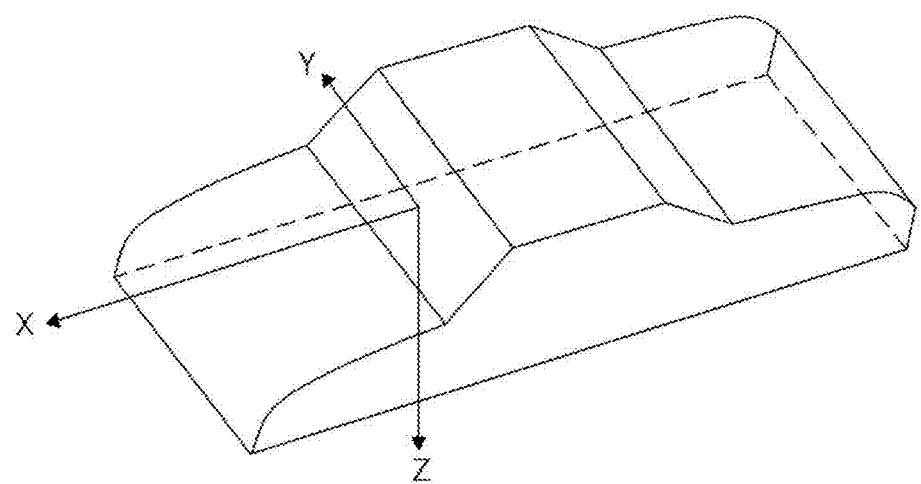
FIG. 10 is an exemplary diagram shown to illustrate acceleration sensor values according to an embodiment of the present invention.
Figure 11:
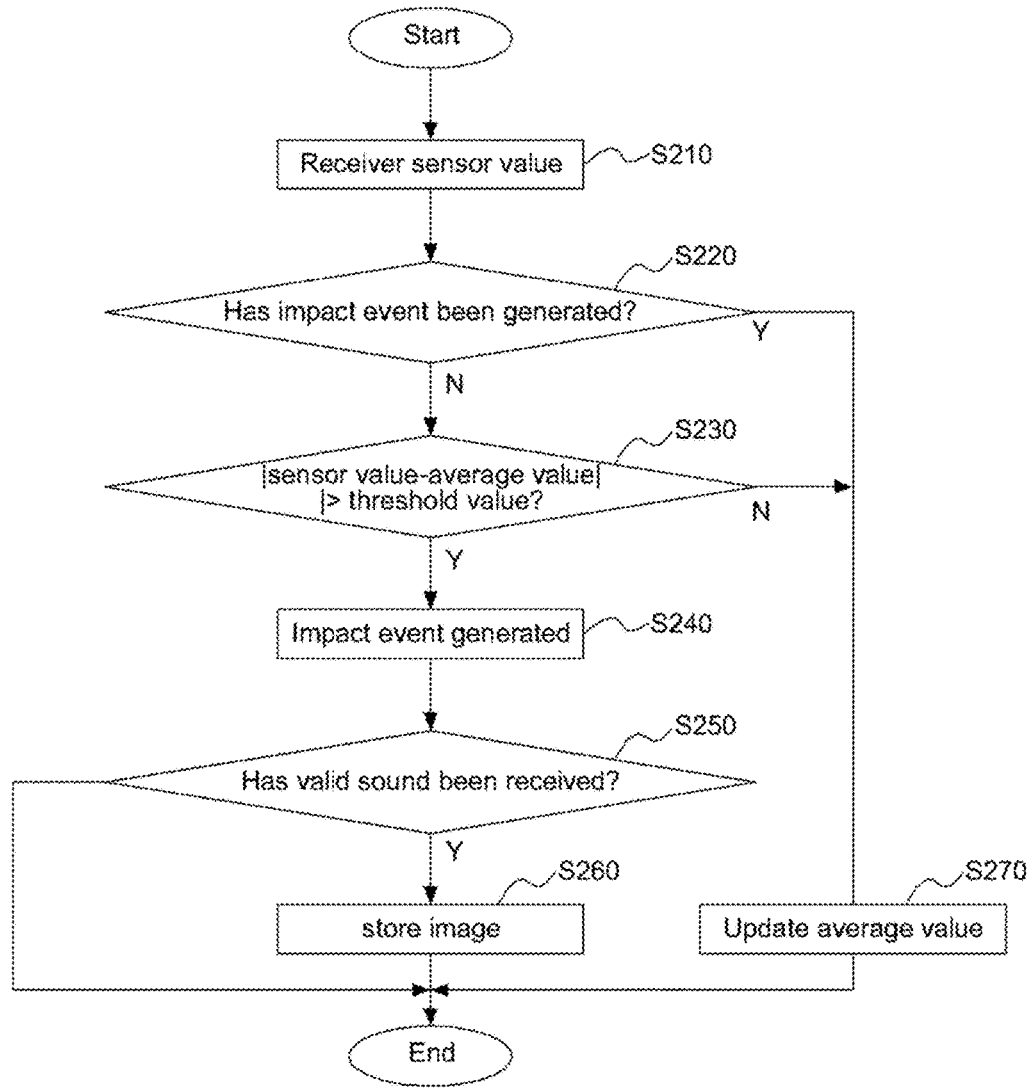
FIG. 11 is a flowchart shown to illustrate an image storage method according to an embodiment of the present invention.
Figure 12:
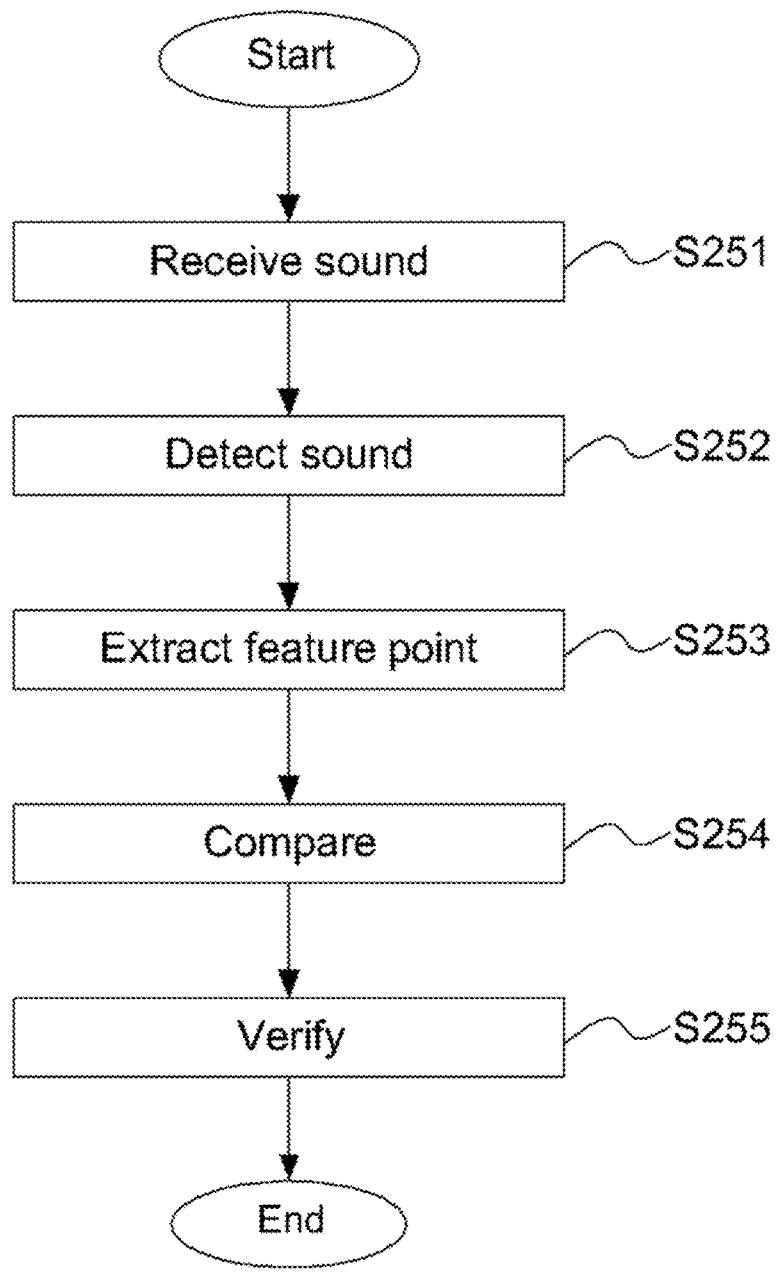
FIG. 12 is a flowchart shown to illustrate whether a sound is a valid sound or not in the image storage method according to an embodiment of the present invention.

FIG. 1 is a block diagram showing an image storage device according to an embodiment of the present invention, FIG. 2 is a flowchart shown to illustrate a method for setting a valid sound and an invalid sound according to an embodiment of the present invention, FIGS. 3 to 5 are exemplary diagrams shown to illustrate the detection of a sound in the method for setting a valid sound and an invalid sound according to an embodiment of the present invention, FIG. 6 is an exemplary diagram shown to illustrate the extraction of feature points in the method for setting a valid sound and an invalid sound according to an embodiment of the present invention, FIGS. 7 to 9 are exemplary diagrams shown to illustrate a classification process in the method for setting a valid sound and an invalid sound according to an embodiment of the present invention, FIG. 10 is an exemplary diagram shown to illustrate acceleration sensor values according to an embodiment of the present invention, FIG. 11 is a flowchart shown to illustrate an image storage method according to an embodiment of the present invention, and FIG. 12 is a flowchart shown to illustrate whether a sound is a valid sound or not in the image storage method according to an embodiment of the present invention.

The image storage device based on an input sound signal according to an embodiment of the present invention is configured to include a processing unit 100, a microphone unit 200, an acceleration sensor unit 300, a front camera unit 400, a rear camera unit 500, a second storage unit 700, and a speaker unit 800.

The microphone unit 200 receives an impact sound according to an impact event.

The acceleration sensor unit 300 outputs an acceleration sensor value according to an impact event.

The front camera 400 captures an external image toward the front of the vehicle, and the rear camera 500 captures an external image toward the back of the vehicle.

In the present invention, the front camera 400 has full HD-level resolution, and the rear camera 500 has HD-level resolution.

The vehicle may further include cameras for capturing external images toward the left and right sides in addition to the front camera 400 and the rear camera 500.

The cameras include a lens module, an image sensor module, an infrared filter module, and an Image Signal Processing (ISP) module.

The second storage unit 700 may be SD card type flash memory.

Verification sounds including a previously set valid sound and invalid sound are stored in the second storage unit 700.

The processing unit 100 is configured to include a CPU 110, a video codec 130, and a first storage unit 150 of a temporary memory type, such as SDRAM, LPDDR2, or LPDDR3.

If an impact event is sensed through the acceleration sensor unit 300 and an impact sound received through the microphone unit 200 corresponds to a valid sound that has been previously set and stored, the processing unit 100 enables images captured through the front camera 400 or the rear camera 500 for a previous specific time and a subsequent specific time on the basis of a point of time at which the impact event is generated to be stored in the second storage unit 700.

In contrast, if an impact event is sensed through the acceleration sensor unit 300 and an impact sound received through the microphone unit 200 corresponds to an invalid sound that has been previously set and stored, the processing unit 100 does not store an image captured through the front camera 400 or the rear camera 500 in the storage unit.

The speaker unit 800 functions to notify a user of an impact event in the form of a sound signal when the impact event is generated.

The verification sounds have been previously set and stored. First, sounds to be used as verification sounds are received through a microphone, etc. (S110).

A valid sound and an invalid sound to be used as verification sounds may have been previously set and received.

For example, a valid sound may include sounds related to a vehicle accident, such as a collision sound, a sudden brake sound, and a scream. An invalid sound may include sounds not related to a vehicle accident, such as a door open/close sound, a trunk closing sound, a speed bump passing sound, a pothole passing sound, a bridge passing sound, and noise within a vehicle.

A valid sound and an invalid sound to be used as verification sounds are not limited to the above examples, and may be set in various ways.

A sound to be used as a verification sound has a frame unit of a length of 30 ms, as shown in FIG. 3. If one frame of a length of 10 ms is omitted, the sound has a form to which a frame of a length of 10 ms is added.

Next, the log energy of the frame is calculated using Equation 1.

$$E(i) = \frac{10\log_{10}\left(\sum_{n=0}^{L-1} x_i^2(n)\right)}{L} \quad \text{Equation 1}$$

In Equation 1, E is the log energy of a frame, i is the index of the frame, x is an input signal, and L is the length of the frame.

Next, as shown in FIGS. 4 and 5, energy of a background noise B and the log energy L of a valid sound and an invalid sound are classified using Equation 2.

$$BE(i) = r \cdot BE(i) + 1(1-r)E(i) \quad \text{Equation 2}$$

In Equation 2, BE is energy of a background noise, and r is an update gain.

Next, as shown in FIG. 6, a Mel frequency cepstrum coefficient is used to extract the feature points P of a valid sound and an invalid sound other than a background noise (S120).

In this case, a common pattern recognition method, such as pre-emphasis, Windowing, Fast Fourier Transform (FFT), a Mel filter bank, logarithmic compression, or Discrete Cosine Transform (DCT), may be used.

Next, the valid sound and the invalid sound whose feature points have been extracted are classified as a valid sound and an invalid sound, respectively, using a Gaussian mixture model (S130).

For reference, FIG. 7 illustrates classification according to 6 mixtures and 1 repetition, FIG. 8 illustrates classification according to 6 mixtures and 300 repetitions, and FIG. 9 illustrates classification according to 10 mixtures and 300 repetitions.

Next, input sounds classified as the valid sound and the invalid sound are stored in order for them to be used as verification sounds (S140).

When verification sounds are previously set and stored as described above, the processing unit 100 receives the current acceleration sensor values through the acceleration sensor unit 300 of the vehicle (S210).

As shown in FIG. 10, for example, coordinates in which the direction toward the front of the vehicle is X, the direction toward the side of the vehicle is Y, and the direction toward the bottom of the vehicle is Z may be set. An acceleration sensor value toward the front may be assumed to be $\alpha_x$, an acceleration sensor value toward the side may be assumed to be $\alpha_y$, and an acceleration sensor value toward the bottom may be assumed to be $\alpha_z$.

Furthermore, an average of a plurality of specific acceleration sensor values $\alpha_x$, an average of a plurality of specific acceleration sensor values $\alpha_y$, and an average of a plurality of specific acceleration sensor values $\alpha_z$ are stored as $\alpha'_x$, $\alpha'_y$, and $\alpha'_z$, respectively.

Next, if an impact event is not generated (S220), a difference between an average value of current acceleration sensor values and a previous acceleration sensor value is compared with a specific detection setting value $V_{th}$ that has been previously set (S230).

For example, if the absolute value of a difference value between $\alpha_x$ and $\alpha'_x$ is greater than the detection setting value $V_{th}$, it means that an impact event has been generated in the X direction. If the absolute value of a difference value between $\alpha_y$ and $\alpha'_y$ is greater than the detection setting value $V_{th}$, it means that an impact event has been generated in the Y direction. If the absolute value of a difference value between $\alpha_z$ and $\alpha'_z$ is greater than the detection setting value $V_{th}$, it means that an impact event has been generated in the Z direction.

In contrast, if the absolute value of the difference value between $\alpha_x$ and $\alpha'_x$ is smaller than or equal to the detection setting value $V_{th}$, the absolute value of the difference value between $\alpha_y$ and $\alpha'_y$ is smaller than or equal to the detection setting value $V_{th}$, or the absolute value of the difference value between $\alpha_z$ and $\alpha'_z$ is smaller than or equal to the detection setting value $V_{th}$, an impact event has not been generated. $\alpha_x$, $\alpha_y$, and $\alpha_z$ are used to update the average values (S270).

Next, if it is determined that an impact event has been generated (S240), an impact sound according to the impact event received through the microphone unit 200 is compared with the verification sounds (S250).

First, when an impact sound according to the impact event is received (S251), a background noise is detected in the impact sound (S252), and a feature point is extracted from the impact sound from which the background noise has been detected (S253).

Steps S251 to S253 are the same as steps S110 and S120, and thus a detailed description thereof is omitted.

Next, the impact sound from which the feature point has been extracted is compared with the verification sounds (S254).

A maximum log-likelihood value of the impact sound from which the feature point has been extracted may be calculated and compared with the verification sounds. Next, whether the impact sound is a valid sound or invalid sound of the verification sounds may be verified (S255).

Next, if the impact sound is matched with the valid sound of the verification sounds, images captured through the camera unit for a previous specific time and a subsequent specific time on the basis of the point of time at which the impact event is generated are stored in the second storage unit 700 (S260).

Table 1 shows an example in which whether images according to an acceleration value, a valid sound, and an invalid sound will be stored is determined.

TABLE 1

| ACCELERATION VALUE | VALID SOUND | INVALID SOUND | DETERMINE |
|---|---|---|---|
| $\|\alpha_x - \alpha_x'\| > V_{th}$, $\alpha_x > 0$ | Collision sound | | Back collision, store images of front and rear cameras |
| $\|\alpha_x - \alpha_x'\| > V_{th}$, $\alpha_x < 0$ | Sudden brake sound, collision sound or scream | | Front collision, store images of front and rear cameras |
| $\|\alpha_y - \alpha_y'\| > V_{th}$ | | Door open/shut sound | Door open/shut |
| $\|\alpha_y - \alpha_y'\| > V_{th}$ | Collision sound | | Side collision, store images of front and rear cameras |
| $\|\alpha_z - \alpha_z'\| > V_{th}$ | Collision sound or scream | | Fall, store images of front and rear cameras |
| $\|\alpha_z - \alpha_z'\| > V_{th}$ | | Trunk shut sound | Trunk shut |
| $\|\alpha_z - \alpha_z'\| > V_{th}$ | | Speed bump passing sound | Speed bump passing |
| $\|\alpha_z - \alpha_z'\| > V_{th}$ | | Pothole sound | Broken road passing |
| $\|\alpha_z - \alpha_z'\| > V_{th}$ | | Bridge passing sound | Bridge passing |

As shown in Table 1, it may be seen that a comparison of an impact sound is added to the determination of an impact event using only an acceleration sensor and an image is stored only when a valid sound is received.

If only an existing acceleration sensor was used, a change of acceleration generated from the side of a vehicle was always considered to be a side collision and thus an impact event was generated. However, whether or not an image will be stored can be determined because an impact sound is classified as a collision sound and a door open/close sound by comparing it with a verification sound.

Furthermore, likewise, in the case of the Z axis, whether or not an image will be stored can be determined because an impact sound is classified as a valid sound and an invalid sound by comparing it with a verification sound.

For reference, if a difference between acceleration in the X axis and acceleration in the Y axis is a $V_{th}$ value or more and $\alpha_x$ is a negative number, it may be considered that a vehicle attempts to be suddenly stopped. In this case, to store an image of the front camera may be more meaningful. If $\alpha_x$ is a positive number, it means that a collision is generated from the back and to store an image of the rear camera may be more meaningful.

As in the case where an impact event is sensed based on an input sound signal as described above, an image classification unit (not shown) for sensing an impact event based on an input image signal may be added to determine an impact event.

For example, if an image showing the state in which an object is close has been stored in the image classification unit as a valid image, a change of acceleration generated from a vehicle may be compared with an input image signal. When an image of the close state is received, this may be determined to be an impact event and the image is stored.

In contrast, if there is a change of acceleration in the vehicle in the state in which an image of the close state has not been received, it may be determined to be not an impact event and the image is not stored.

Meanwhile, the image storage method based on an input sound signal according to steps S110 to S140, S210 to S270, and S251 to S255 according to the present invention may be programmed and stored in a recording medium, such as CD-ROM, memory, ROM, or EEPROM so that it is readable by a computer.

Although the preferred embodiments of the present invention have been described in the above description, the present invention is not necessarily limited to some exemplary embodiment. It may be easily understood that those skilled in the art to which the present invention pertains may substitute, modify, and change the present invention in various ways without departing from the technical spirit of the present invention.

INDUSTRIAL APPLICABILITY

In the present invention, the image storage device based on an input sound signal is used. When a previously set impact sound attributable to an impact event is received in addition to acceleration sensor values in the vehicle black box, an image at a previous specific time and an image at a subsequent specific time based on a point of time at which the impact event is generated are stored. Accordingly, a larger number of images can be stored in memory having a limited storage space.

The invention claimed is:

1. An image storage device based on an input sound signal, comprising:
   an acceleration sensor unit configured to output an acceleration sensor value in response to receipt of an impact event;
   a microphone unit configured to receive an impact sound in response to receipt of the impact event;
   a camera unit configured to capture an external image; and
   in response to detection of the impact event through the acceleration sensor unit, a processing unit configured to determine whether acceleration sensor values with respect to a bottom, a front, and a side directions of a vehicle are greater than an average acceleration sensor values occurred during past time, the average acceleration sensor values corresponding to each of the acceleration sensor values of the bottom, front, and side directions of the vehicle, and
   in response to detection of the impact event being greater than all of the average acceleration sensor values in the bottom, front, and side directions of the vehicle,
   the processing unit configured to receive the impact sound and to determine whether the impact sound corresponds to a sound which having been previously set and stored, and
   in response determination both of acceleration sensor values with respect to the bottom, front, and side directions of the vehicle are greater than the average acceleration sensor values occurred during the past time and the impact sound corresponds to the sound which having been previously set and stored,
   the processing unit further configured to selectively store images through the camera unit in a storage unit, the images corresponding to the selectively stored images captured for a previous specific time and a subsequent specific time based on a point of time at which the impact event is generated.

2. The image storage device of claim 1, further comprising:
   verification sounds being stored in the storage unit, the verification sounds comprising a valid sound and invalid sound.

3. The image storage device of claim 2, wherein the valid sound is a sound related to a vehicle accident, and the invalid sound is a sound not related to a vehicle accident.

4. The image storage device of claim 2, wherein the processing unit is configured not to store an image captured through the camera unit in the storage unit in response to detection of the impact event through the acceleration sensor unit and in response to determination of the impact sound received through the microphone unit corresponding to the invalid sound.

5. The image storage device of claim 1, wherein the processing unit determines whether the impact event is a valid impact event based on a difference between a current acceleration sensor value and an average value of previous acceleration sensor values being greater than a predetermined detection setting value.

6. An image storage method based on input sound and acceleration signals, comprising:
   comparing differences between current acceleration sensor values received with respect to a bottom, a front, and a side directions respectively of a vehicle, being greater than an average acceleration sensor values occurred during past time the average acceleration sensor values corresponding to each of the acceleration sensor values of the bottom, front, and side directions of the vehicle;
   in response to detection of an impact event being greater than all of the average acceleration sensor values in the bottom, front, and side directions of the vehicle,
   receiving impact sound and determining whether the impact sound correspond to a sound which having been previously set and stored; and
   in response determination both of acceleration sensor values with respect to the bottom, front, and side directions of the vehicle are greater than the average acceleration sensor values occurred during the past time and the impact sound corresponds to the sound which having been previously set and stored,
   selectively storing images, the selectively stored images being captured at a previous specific time and a subsequent specific time based on a point of time at which the impact event is generated.

7. The image storage method of claim 6, further comprising:
   detecting a background noise from an input sound;
   extracting a feature point from the input sound excepting the background noise detected; and
   classifying the input sound from which the feature point has been extracted into a valid sound and an invalid sound and storing the valid sound and the invalid sound as the verification sounds.

8. The image storage method of claim 7, wherein the detecting a background noise from the impact sound further comprises:
   calculating log energy of the input sound having a frame unit of a length of 30 ms and the impact sound, and detecting the background noise.

9. The image storage method of claim 7, wherein in the extracting a feature point from the impact sound, a Mel frequency cepstrum coefficient is used to extract the feature points of the input sound and the impact sound excepting the background noise.

10. The image storage method of claim 7, wherein the-classifying the input sound from which the feature point has been extracted into the valid sound and the invalid sound is performed using a Gaussian mixture model.

11. The image storage method of claim 6, wherein comparing the impact sound according to the impact event with previously set and stored verification sounds further comprises:
   detecting a background noise from the impact sound;
   extracting a feature point from the impact sound excepting the background noise;

comparing the feature point of the impact sound extracted in the feature point extraction step with the verification sound; and determining whether the impact sound is a valid sound or an invalid sound of the verification sound.

12. The image storage method of claim 11, wherein the comparing the feature point of the impact sound extracted in the feature point extraction step with the verification sound further comprises:

calculating a maximum likelihood value of the impact sound from which the feature point has been extracted, and comparing the maximum likelihood value with the verification sound.

13. The image storage method of claim 11, wherein the detecting a background noise from the impact sound comprises:

calculating log energy of the input sound having a frame unit of a length of 30 ms and the impact sound, and detecting the background noise.

14. The image storage method of claim 11, wherein the extracting a feature point from the impact sound excepting the background noise comprises:

a Mel frequency cepstrum coefficient is used to extract the feature points of the input sound and the impact sound other than the background noise.

15. A non-transitory recording medium comprising a computer executable program, which when executed by a processor, instructs the processor to perform the following steps:

comparing differences between current acceleration sensor values received with respect to a bottom, a front, and a side directions respectively of a vehicle, being greater than an average acceleration sensor values occurred during past time the average acceleration sensor values corresponding to each of the acceleration sensor values of the bottom, front, and side directions of the vehicle;

in response to detection of an impact event being greater than all of the average acceleration sensor values in the bottom, front, and side directions of the vehicle, receiving impact sound and determining whether the impact sound correspond to a sound which having been previously set and stored; and in response determination both of acceleration sensor values with respect to the bottom, front, and side directions of the vehicle are greater than the average acceleration sensor values occurred during the past time and the impact sound corresponds to the sound which having been previously set and stored, selectively storing images, the selectively stored images being captured at a previous specific time and a subsequent specific time based on a point of time at which the impact event is generated.

* * * * *